(12) United States Patent
Yang et al.

(10) Patent No.: US 12,199,529 B2
(45) Date of Patent: Jan. 14, 2025

(54) RECYCLING PIEZOELECTRIC ENERGY-HARVESTING SWITCHED-INDUCTOR CMOS CHARGER

(71) Applicant: Georgia Tech Research Corporation, Atlanta, GA (US)

(72) Inventors: Siyu Yang, Atlanta, GA (US); Gabriel Alfonso Rincon-Mora, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 692 days.

(21) Appl. No.: 17/516,198

(22) Filed: Nov. 1, 2021

(65) Prior Publication Data

US 2022/0069741 A1   Mar. 3, 2022

Related U.S. Application Data

(63) Continuation of application No. 17/463,407, filed on Aug. 31, 2021, now abandoned.

(60) Provisional application No. 63/074,151, filed on Sep. 3, 2020.

(51) Int. Cl.
| | |
|---|---|
| *H02N 2/18* | (2006.01) |
| *H02J 7/00* | (2006.01) |
| *H02J 50/00* | (2016.01) |
| *H02M 1/00* | (2006.01) |

(52) U.S. Cl.
CPC ............. *H02N 2/186* (2013.01); *H02J 7/007* (2013.01); *H02J 50/001* (2020.01); *H02J 2207/20* (2020.01); *H02J 2207/50* (2020.01); *H02M 1/0095* (2021.05)

(58) Field of Classification Search
CPC ......... H02N 2/186; H02N 2/181; H02J 7/007; H02J 2207/50; H02J 2207/20; H02J 50/001; H02M 1/0095
USPC .......................... 320/107, 137, 140, 158, 163
See application file for complete search history.

(56) References Cited

U.S. PATENT DOCUMENTS

| | | | | |
|---|---|---|---|---|
| 2006/0097707 A1* | 5/2006 | Inoshita | ............... | H02M 3/1582 323/222 |
| 2010/0271147 A1* | 10/2010 | Leibman | ................... | H04R 3/04 331/160 |
| 2011/0285131 A1* | 11/2011 | Kwon | .................... | H02N 2/181 290/50 |
| 2014/0062389 A1* | 3/2014 | Ide | ............................ | H02J 7/32 320/107 |

* cited by examiner

*Primary Examiner* — Edward Tso
*Assistant Examiner* — Aaron Piggush
(74) *Attorney, Agent, or Firm* — Troutman Pepper Hamilton Sanders LLP; Ryan A. Schneider; Mark Lehi Jones

(57) ABSTRACT

Devices and methods for charging a power storage device using a piezoelectric energy-harvest charger that employs a single switched inductor stage. The charger may maintain a maximum power point without requiring a second switched inductor stage.

20 Claims, 11 Drawing Sheets

US 12,199,529 B2

RECYCLING PIEZOELECTRIC ENERGY-HARVESTING SWITCHED-INDUCTOR CMOS CHARGER

CROSS-REFERENCE TO RELATED APPLICATIONS

This application is a continuation of U.S. patent application Ser. No. 17/463,407, filed 31 Aug. 2021, which claims the benefit of U.S. Provisional Application Ser. No. 63/074,151 filed on Sep. 3, 2020. The contents of which are incorporated herein by reference in their entirety as if fully set forth below.

FIELD OF THE DISCLOSURE

The various embodiments of the present disclosure relate generally to energy harvesting, and in particular, to devices and methods for charging a power storage device using a piezoelectric energy-harvest charger that employs a single switched inductor stage.

BACKGROUND

Wireless microsystems embedded in buildings, vehicles, clothing, etc., can collect and transmit information about the surrounding environment. To reduce the size of the onboard batteries and/or to reduce the frequency of replacing such batteries, researchers have sought out solutions that can replenish rechargeable batteries with ambient energy from light, motion, and/or heat.

Among the energy harvesting transducers, photovoltaic cells under direct sunlight can output the highest power. However, sunlight is not always available, and when artificial lighting is used, the power level drops significantly. Recent advances in micro-electro-mechanical systems (MEMS) technology have led to new energy harvesting transducers that can utilize piezoelectric transducers to harvest moderate power from vibrating motion. Such piezoelectric harvesters can constantly replenish the onboard battery to power microsystems.

Piezoelectric transducers can generate alternating current via vibration that charges the intrinsic capacitor. As illustrated in FIG. 1, a typical piezoelectric-powered wireless microsystem 100 can include a piezoelectric transducer 102, a charger 104 that draws power from the transducer 102 to charge a battery 106, and a voltage regulator 108 to provide power to the electronic blocks 110 of the microsystem 100. Because the drawn power is usually moderate to low, a design goal is to have the charger output maximum power. Thus, such chargers often incorporate a maximum power point (MPP) function.

Among the existing piezoelectric chargers, a basic diode bridge and half-bridge can collect some, but not all, charge created by the transducer 102. A conventional diode bridge charger 200, for example, is depicted in FIG. 2. In this charger 200, a first inductor 206 is utilized between the piezoelectric element 202 (with its intrinsic capacitance $C_{PZ}$ 204) and a bridge rectifier 208, and a second inductor is used in the switched inductor MPP charger 210.

Without a harvester, the piezoelectric current charges the inherent capacitor $C_{PZ}$ 204 by the open-circuit voltage $\Delta V_{PZ(OC)}$ every half cycle $$\Delta v_{PZ(OC)} = \frac{1}{C_{PZ}} \int_0^{0.5t_{VIB}} i_{PZ(PK)} \sin\left(\frac{2\pi t}{t_{VIB}}\right) dt = \frac{i_{PZ(PK)} t_{VIB}}{\pi C_{PZ}}, \quad (1)$$

where $C_{PZ}$ is the intrinsic capacitance of the transducer, $t_{VIB}$ is the vibration period, and $i_{PZ(PK)}$ is the peak current generated by the vibration. Because piezoelectric transducers have low mechanical-to-electrical coupling, the power that is converted into the electrical domain is just a tiny portion of the overall power of the vibration. This means electrical damping is much smaller than mechanical damping, and the power drawn from the vibration does not affect the displacement of the vibration. Therefore, the charge which the vibration creates is only dependent on the vibration strength and the mechanical attributes of the piezoelectric transducer. As a result, the higher the piezoelectric voltage, the more power the charge generates.

In designs where the conventional diode bridge charger 200 is set up as a synchronous switch harvesting inductor (SSHI), it can draw the highest power by putting the breakdown voltage across the transducer 202 each half cycle by using the inductor 206 to collect and flip the charge on $C_{PZ}$ between half-cycles when the piezoelectric current changes direction. However, the recycling bridge/SSHI has to maintain the rectified voltage $V_{REC}$ near the breakdown voltage $V_{BD}$ of the CMOS components to keep the drawn power high, and as a result, a second (bulky and lossy) switched-inductor (SL) stage 210 is utilized to maintain MPP. In such devices, a portion of the charge is lost to discharging and charging the piezoelectric voltage between positive and negative rectified voltages. As a result, the drawn power is low. Furthermore, the voltage and subsequent drawn power are limited by the breakdown voltage. In such conventional systems, the extra inductor can be too bulky for certain applications. Technical advances are still needed in energy harvesting chargers to limit the overall volume and improve performance.

BRIEF SUMMARY

The disclosed technology relates to devices and methods for charging a power storage device using a piezoelectric energy-harvest charger that employs a single switched inductor stage.

An exemplary embodiment of the disclosed technology includes a switched-inductor power harvesting charger device having circuit components that include a piezoelectric transducer (PZT), an inductor (Lx), a power storage device (B), and a switch components. The switch components can include: a positive current grounding switch (SGI+), a negative current grounding switch (SGI−), a positive current energizing switch (SI+), a negative current energizing switch (SI−), a positive bridge grounding switch (SG+), a negative bridge grounding switch (SG−), a positive bridge output switch (SO+), and a negative bridge output switch (SO−). Each of the circuit components have a corresponding first end (*1) and a corresponding second end (*2). The circuit components and switch components may be connected as follows: PZT*1 is connected to SGI+*1 and SI+*1, PZT*2 is connected to SGI−*2 and SI−*1, SGI+*2 is connected to SGI−*1 and to ground, SI+*2 is connected to SG+*1, SO+*1, and Lx*1, SI−*2 is connected to SG−*2, SO−*2, and Lx*2, SO+*2 is connected to SO−*1 and B*1, and B*2 is connected to ground. The switch components are individually controllable to transfer a vibration-induced current from the PZT to the power storage device B for charging the power storage device B.

A method is provided for harvesting vibration-induced current from a piezoelectric transducer (PZT) to charge a power storage device (B) using an inductor (Lx) and a switch circuit, In accordance with certain exemplary implementations of the disclosed technology, The method includes sensing, with a microcontroller, a PZT output voltage signal from the PZT, and controlling, with the microcontroller, a conduction state of switch components in the switch circuit responsive to the PZT output voltage signal to charge the B. The switch components can include: a positive current grounding switch (SGI+), a negative current grounding switch (SGI−), a positive current energizing switch (SI+), a negative current energizing switch (SI−), a positive bridge grounding switch (SG+), a negative bridge grounding switch (SG−), a positive bridge output switch (SO+), and a negative bridge output switch (SO−). Each of the circuit components have a corresponding first end (*1) and a corresponding second end (*2). The circuit components and switch components may be connected as follows: PZT*1 is connected to SGI+*1 and SI+*1, PZT*2 is connected to SGI−*2 and SI−*1, SGI+*2 is connected to SGI−*1 and to ground, SI+*2 is connected to SG+*1, SO+*1, and Lx*1, SI−*2 is connected to SG−*2, SO−*2, and Lx*2, SO+*2 is connected to SO−*1 and B*1, and B*2 is connected to ground. The switch components are individually controllable to transfer a vibration-induced current from the PZT to the power storage device B for charging the power storage device B.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. Similarly, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. To illustrate the disclosure, specific embodiments are shown in the drawings. It should be understood, however, that the disclosure is not limited to the precise arrangements and instrumentalities of the embodiments shown in the drawings.

DETAILED DESCRIPTION

The disclosed technology includes systems and methods for charging power storage devices using a piezoelectric energy-harvesting charger that employs a single switched inductor stage. In certain exemplary implementations of the disclosed technology, a piezoelectric transducer can be used to harvest ambient vibration energy, and the circuits disclosed herein may be used to provide maximum power-point energy storage, for example, to power other devices. Certain exemplary implementations of the disclosed technology may enable outputting high power and maintaining maximum power-point to support functionality for wireless microsystems and the like. In certain exemplary implementations, the recycling switched-inductor charger disclosed herein induces current at the highest voltage by keeping the piezoelectric voltage near the breakdown voltage of the CMOS charger to draw the highest power from the transducer.

The charger circuit disclosed herein may sense when the piezoelectric voltage reaches breakdown voltage, and the circuit may control switches to draw a portion of the piezoelectric energy to energize an inductor and to charge an energy storage device, such as a battery, supercapacitor, etc. Various energy storage devices may be utilized with the disclosed technology. Any references to the use of a battery for energy storage herein do not limit the scope of the disclosed technology. A supercapacitor, ultracapacitor, and the like may be utilized as a battery.

Certain exemplary implementations of the disclosed technology may utilize direct inductor transfers that allow the inductor to transfer more energy than it carries, saving ohmic loss. With a single inductor and a single stage to charge the battery across its voltage range, a prototype of the disclosed recycling switched-inductor charger has been made that can deliver 0.1-91 µW from vibrating a 15 nF piezoelectric transducer at 120 Hz with 0.1 to 10.5 V open-circuit voltage. The disclosed technology can output net power at 80% smaller voltage than the state of the art, can output up to 12× higher power than a lossless bridge can draw from the same transducer, and can output 76% of the theoretical maximum power a transducer can produce.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include but are not limited to, similar components or steps that are developed after the embodiments disclosed herein.

Figure 1:
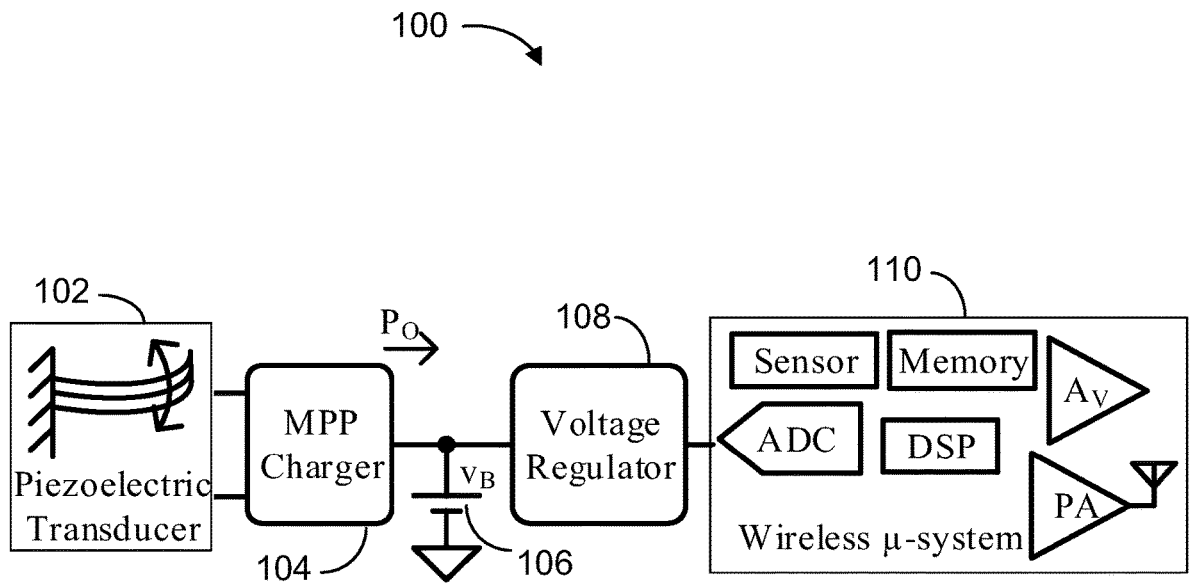
FIG. 1 illustrates an exemplary piezoelectric-powered wireless microsystem.
Figure 2:
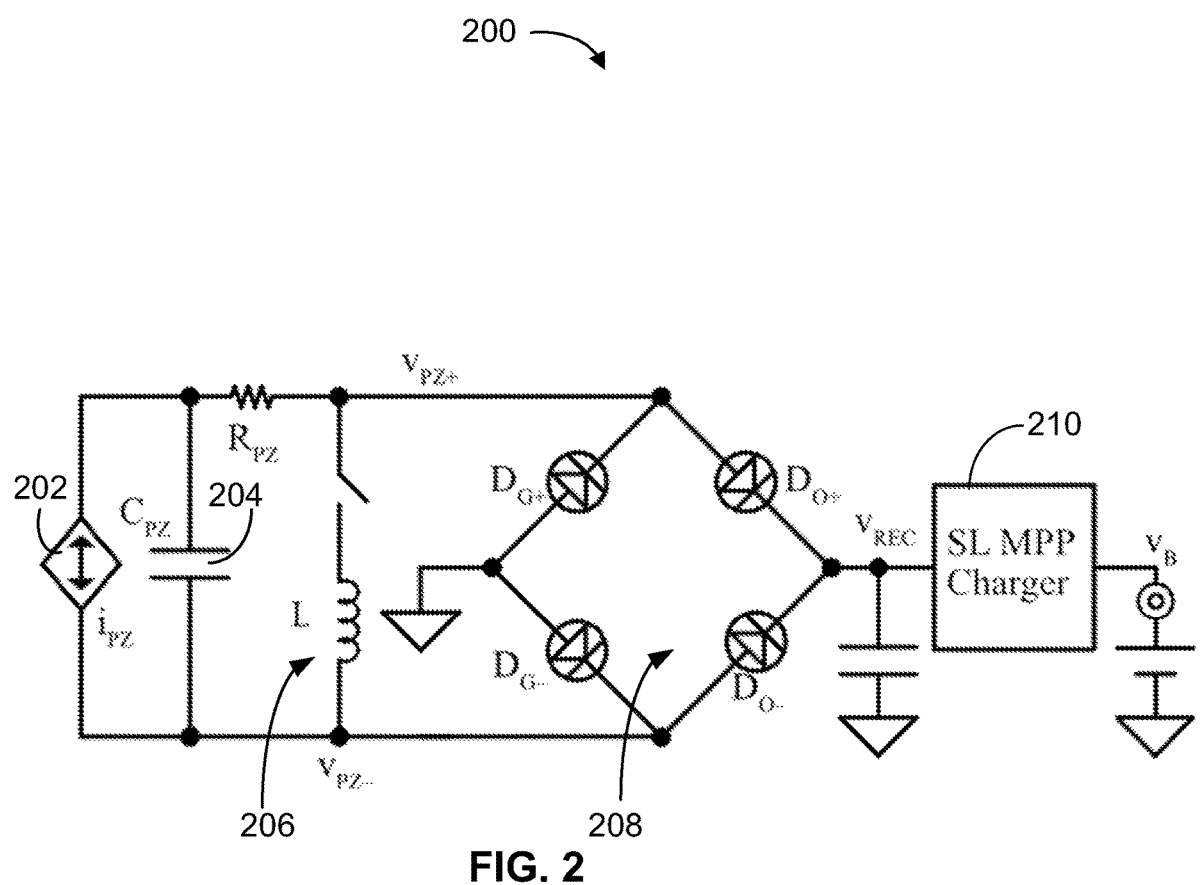
FIG. 2 illustrates a conventional recycling bridge.
Figure 3:
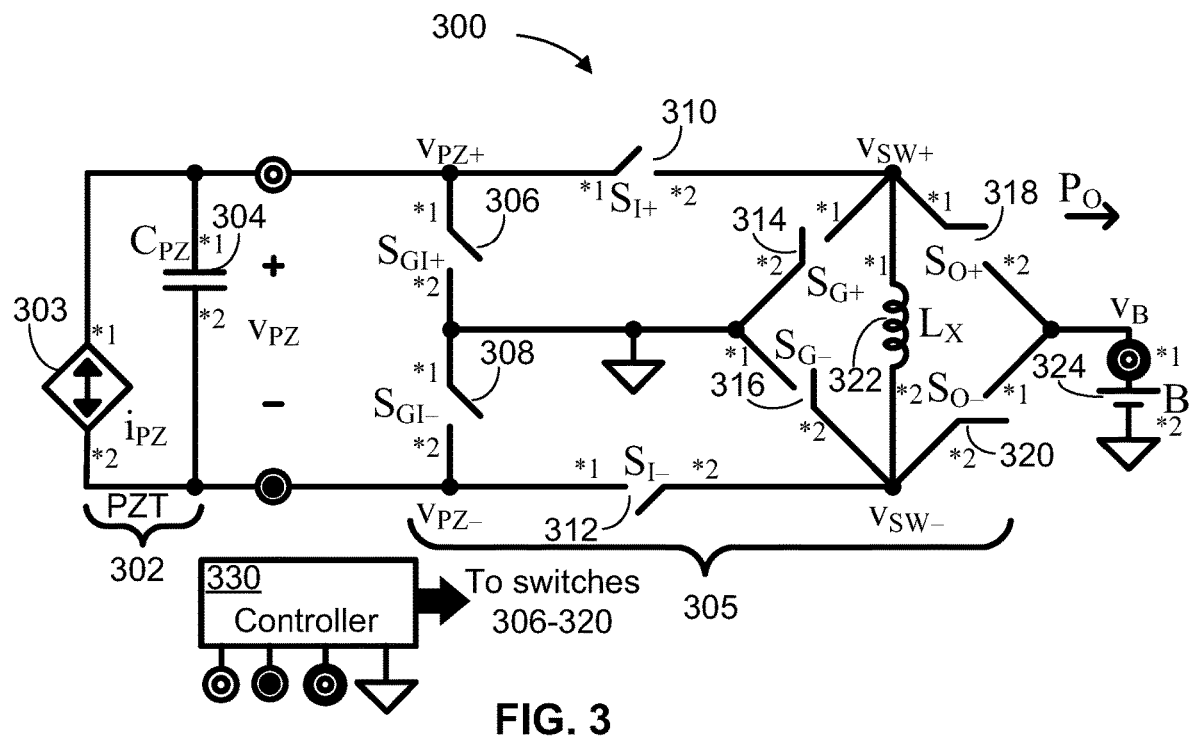
FIG. 3 is a circuit diagram of a recycling switched-inductor charger, in accordance with an exemplary embodiment of the disclosed technology.

FIG. 3 is a circuit diagram of a recycling switched-inductor charger 300, in accordance with an exemplary embodiment of the disclosed technology. In certain exemplary implementations, the charger 300 can include a piezoelectric transducer PZT 302, which is modeled as a current source $i_{PZ}$ 303 in parallel with its inherent capacitance $C_{PZ}$ 304. The charger 300 can include (or be in communication with) a controller 330 that may, for example, sense voltages and individually control the associated switches 306-320.

The recycling switched-inductor charger 300 can include a switch network 305 an inductor $L_X$ 322, and a battery B 324 having an associated battery voltage $V_B$. The switch network 305 can include switch components, such as a positive current grounding switch SGI+ 306, a negative current grounding switch SGI− 308, a positive current energizing switch SI+ 310, a negative current energizing switch SI− 312, a positive bridge grounding switch SG+ 314, a negative bridge grounding switch SG− 316, a positive bridge output switch SO+ 318, and a negative bridge output switch SO− 320, where each of the circuit components has a corresponding first end *1 and a corresponding second end *2.

In accordance with the disclosed technology, the first end *1 of the PZT 302 may be connected to the first end *1 of SGI+ 306 and the first end *1 SI+310. The second end *2 of the PZT 302 may be connected to the second end *2 of SGI− 308 and the first end *1 of SI− 312. The second end *2 of SGI+ 306 may be connected to the first end *1 of SGI−308 and to ground. The second end *2 of SI+310 may be connected to the first end *1 of SG+ 314, the first end *1 of SO+ 318, and the first end *1 of Lx 322. The second q end *2 of SI− 312 may be connected to the second end *2 of SG− 316, the second end *2 of SO− 320, and the second end *2 of Lx 322. The second end *2 of SO+ 318 may be connected to the first end *1 of SO− 320 and the first end *1 of the energy storage device B 324. The second end *2 of energy storage device B 324 may be connected to ground.

The recycling switched-inductor charger 300 disclosed herein differs from the conventional or previous state-of-the-art recycling bridge in that it charges the battery at maximum power point (MPP) using a single switched inductor (SL) stage, without requiring a second dedicated SL stage to maintain MPP.

Figure 4:
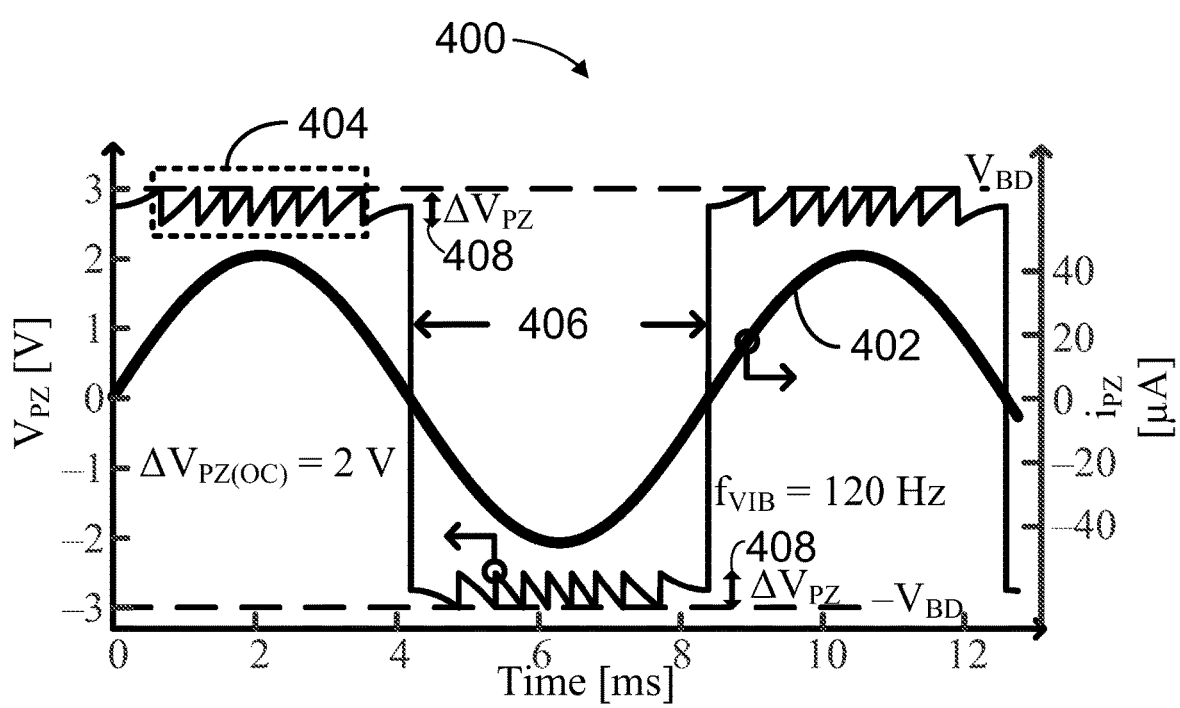
FIG. 4 is a graph illustrating current generated from a piezoelectric device, energy transfers to a power storage device, and power recycling using the circuit shown in FIG. 3, in accordance with an exemplary embodiment of the disclosed technology.

FIG. 4 is a graph 400 illustrating certain signals that correspond to the circuit diagram of the recycling switched-inductor charger 300 as shown in FIG. 3. The graph 400 shows an example vibration-induced (120 Hz) sinusoidal current 402 generated from a piezoelectric device (such as the PZT 302 shown in FIG. 3), energy transfers 404 to a power storage device (such as the battery B 324 shown in FIG. 3), and power recycling transfers 406, in accordance with an exemplary embodiment of the disclosed technology. The switching sequence of the various switches 306-320, as shown in FIG. 3, will be further discussed below with reference to FIG. 5.

Across vibration half-cycles, the current source $i_{PZ}$ 303 charges $C_{PZ}$ 304. The controller 330 may be utilized to sense that the magnitude of the voltage $|V_{PZ}|$ across the PZT 302 as it reaches the maximum power point $V_{PZ(PK)}$. The controller 330 may set the conduction state of one or more of the switches 306-320 to initiate a battery-charging transfer, to collect a portion of the charge to energize the inductor Lx 322, and then charge the battery B 324. Each battery-charging transfer draws a small amount of energy $\Delta E_{PZ}$ from the capacitor $C_{PZ}$ 304, and the associated voltage across the capacitor $C_{PZ}$ 304 may, in turn, drop by $\Delta V_{PZ}$ 408. In accordance with certain exemplary implementations, the value of the inductor Lx 322 may be chosen with respect to $C_{PZ}$ 304 so that the associated LC time constant is in a range of about $1/10^{th}$ to about $1/10,000^{th}$ of the vibration half cycle time. For example, the LC time constant can be on the order of microseconds (for example, 10 µs) while the vibration half cycle may be on the order of milliseconds (for example, 4 ms). This enables a number of small energy transfers at maximum power point $V_{PZ(PK)}$. After the battery-charging transfer, the controller 330 may set the conduction state of certain switches so that the current source $i_{PZ}$ 303 may charge $C_{PZ}$ 304 again.

In certain exemplary implementations, the controller 330 may initiate a battery-charging transfer whenever $|V_{PZ}|$ reaches $V_{PZ(PK)}$, which keeps $|V_{PZ}|$ below $V_{PZ(PK)}$. The controller 330 may close SGI− 308 to connect the second end *2 of the $C_{PZ}$ 304 with the lower potential to ground, and the maximum power point $V_{PZ(PK)}$ to the breakdown voltage $V_{BD}$. This way, the charger 300 does not see a negative voltage, which eliminates the need for a negative supply, and the charger 300 does not see a voltage higher than $V_{BD}$ to maintain safe operation. Even if the open-circuit voltage $\Delta V_{PZ(OC)}$ goes above $V_{BD}$ as the vibration strength increases, the voltage gain on the capacitor is broken into smaller intervals by the battery-charging transfers. Therefore, the charger 300 can safely operate with a wider vibration range.

In accordance with certain exemplary implementations of the disclosed technology, and as illustrated in FIG. 4, the switching sequence may repeat itself until $i_{PZ}$ reverses polarity and a half cycle ends. The charger 300 may then initiate a recycling transfer 406, where Lx 311 collects charge from $C_{PZ}$ 304 and puts it back to $C_{PZ}$ 304 in the opposite direction. This way, the charge is recycled quickly, and $V_{PZ}$ can be near $V_{PZ(PK)}$ at the start of the next half-cycle. Without losses, $|V_{PZ}|$ may remain between $V_{PZ(PK)} - \Delta V_{PZ}$ and $V_{PZ(PK)}$. If the controller 330 sets $V_{PZ(PK)}$ to the breakdown voltage $V_{BD}$, and $\Delta V_{PZ} \ll V_{BD}$, the charger 300 can draw the maximum power possible from the PZT 302.

FIGS. 5A-5E illustrate the switching sequence across the positive half cycle for the recycling switched-inductor charger 300 as shown in FIG. 3. The dotted trace lines illustrate the current flow for each switching configuration. Since the operation and the charger 300 is completely symmetrical, the negative half cycle is the same but flipped vertically for the charger.

Figure 5A:
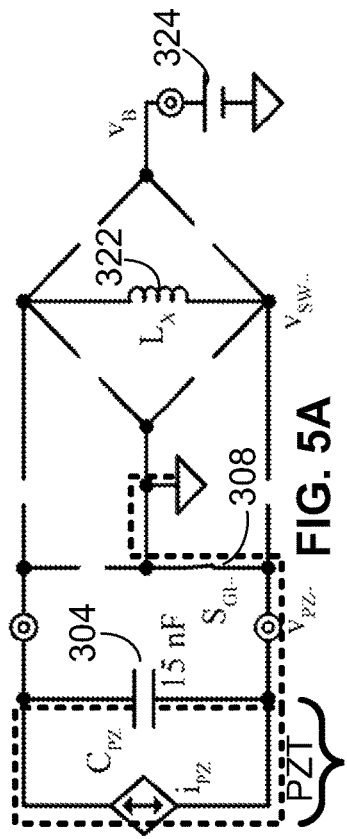
FIG. 5A shows an initial switching configuration of the recycling switched-inductor charger (as shown in FIG. 3) where current from the piezoelectric transducer charges the inherent capacitor $C_{PZ}$, in accordance with an exemplary embodiment of the disclosed technology.

FIG. 5A shows an initial switching configuration of the recycling switched-inductor charger 300 (as shown in FIG. 3) where positive current from the piezoelectric transducer PZT 302 charges the inherent capacitor $C_{PZ}$ 304, in accordance with an exemplary embodiment of the disclosed technology.

Figure 5B:
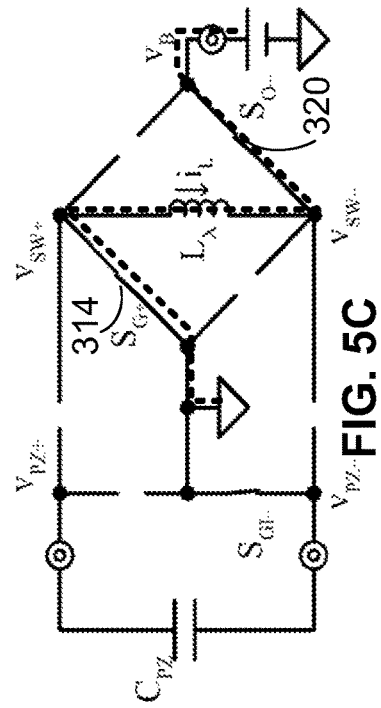
FIG. 5B shows a switching configuration of the recycling switched-inductor charger (as shown in FIG. 3) where charge from the inherent capacitor $C_{PZ}$ is used to energize the inductor Lx, in accordance with an exemplary embodiment of the disclosed technology.

FIG. 5B shows a switching configuration of the recycling switched-inductor charger 300 (as shown in FIG. 3) where charge from the inherent capacitor $C_{PZ}$ 304 is used to energize the inductor Lx 322, in accordance with an exemplary embodiment of the disclosed technology.

Figure 5C:
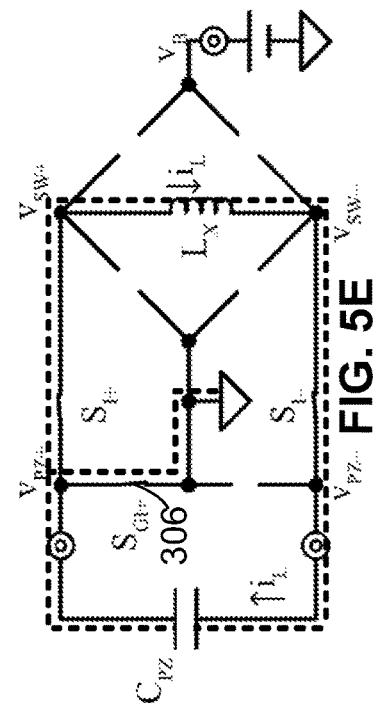
FIG. 5C shows a switching configuration of the recycling switched-inductor charger (as shown in FIG. 3) where stored energy in the inductor Lx is utilized to charge the energy storage device, in accordance with an exemplary embodiment of the disclosed technology.

FIG. 5C shows a switching configuration of the recycling switched-inductor charger 300 (as shown in FIG. 3) where stored energy in the inductor Lx 322 is utilized to charge the battery 324, in accordance with an exemplary embodiment of the disclosed technology.

Figure 5D:
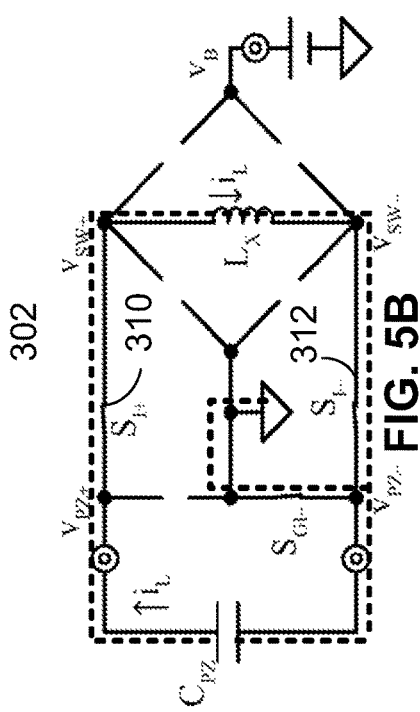
FIG. 5D shows a switching configuration of the recycling switched-inductor charger (as shown in FIG. 3) where charge from the inherent capacitor $C_{PZ}$ is used for direct transfer to simultaneously energize the inductor Lx and charge the energy storage device, in accordance with an exemplary embodiment of the disclosed technology.

FIG. 5D shows a switching configuration of the recycling switched-inductor charger 300 (as shown in FIG. 3) where charge from the inherent capacitor $C_{PZ}$ 304 is used for direct transfer to simultaneously energize the inductor Lx 322 and charge the battery 324, in accordance with an exemplary embodiment of the disclosed technology.

Figure 5E:
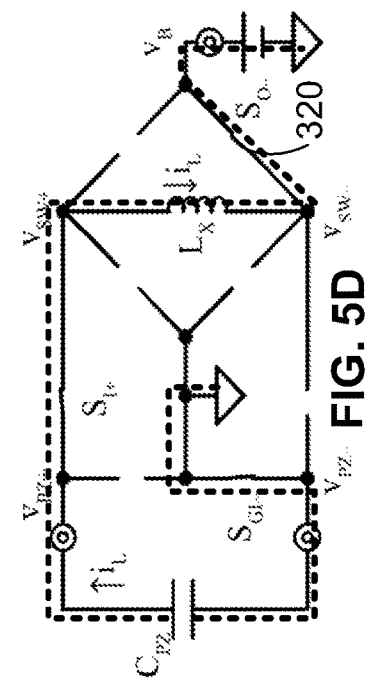
FIG. 5E shows a switching configuration of the recycling switched-inductor charger (as shown in FIG. 3) where the inductor Lx recycles its energy to charge the inherent capacitor $C_{PZ}$ to a negative voltage, in accordance with an exemplary embodiment of the disclosed technology.

FIG. 5E shows a switching configuration of the recycling switched-inductor charger 300 (as shown in FIG. 3) where the inductor Lx 322 recycles its energy to charge the inherent capacitor $C_{PZ}$ 304 to a negative voltage, in accordance with an exemplary embodiment of the disclosed technology.

Returning to FIG. 5A, when $i_{PZ}$ charges $C_{PZ}$ 304 open-circuit, only SGI− 308 is closed by the controller 330 to connect the negative lead ($V_{PZ-}$) of the PZT 302 to ground. As a result, only positive voltages appear in the charger 300.

As shown in FIG. 5B, when a battery-charging transfer is initiated, SI+ 310 and SI− 312 are closed by the controller 330 for $C_{PZ}$ to partially energize Lx 322.

As shown in FIG. 5C, when the voltage drop on $C_{PZ}$ 304 reaches the targeted $\Delta V_{PZ}$, the controller 330 opens SI+ 310 and SI− 312 while closing SG+ 314 and SO− 320 so that the inductor current on Lx 322 can charge the battery. 324. In accordance with certain exemplary implementations of the disclosed technology, the controller 330 adjusts the target $\Delta V_{PZ}$ by varying the energizing time. As the current $i_L$ in the inductor Lx 322 drops to 0, the controller opens both switches SG+ 314 and SO− 320, and the charger goes back to the configuration shown in FIG. 5A.

Figure 6:
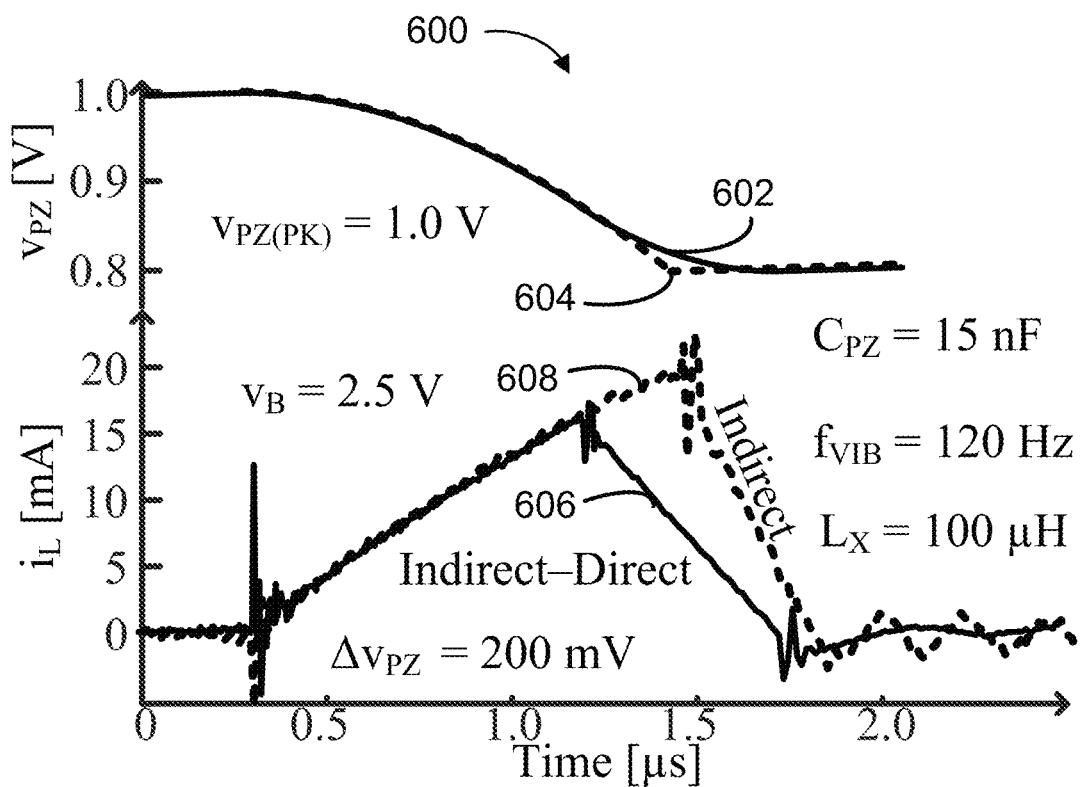
FIG. 6 shows measured voltage and current for charging transfers, in accordance with an exemplary embodiment of the disclosed technology.

FIG. 6 shows a graph 600 of measured indirect-direct voltage 602 and current 606, and indirect voltage 604 and current 608 for charging transfers, in accordance with an exemplary embodiment of the disclosed technology. From 0.5 μs to 1.1 μs, $C_{PZ}$ energizes Lx using the switching configuration of FIG. 5B.

Figure 7:
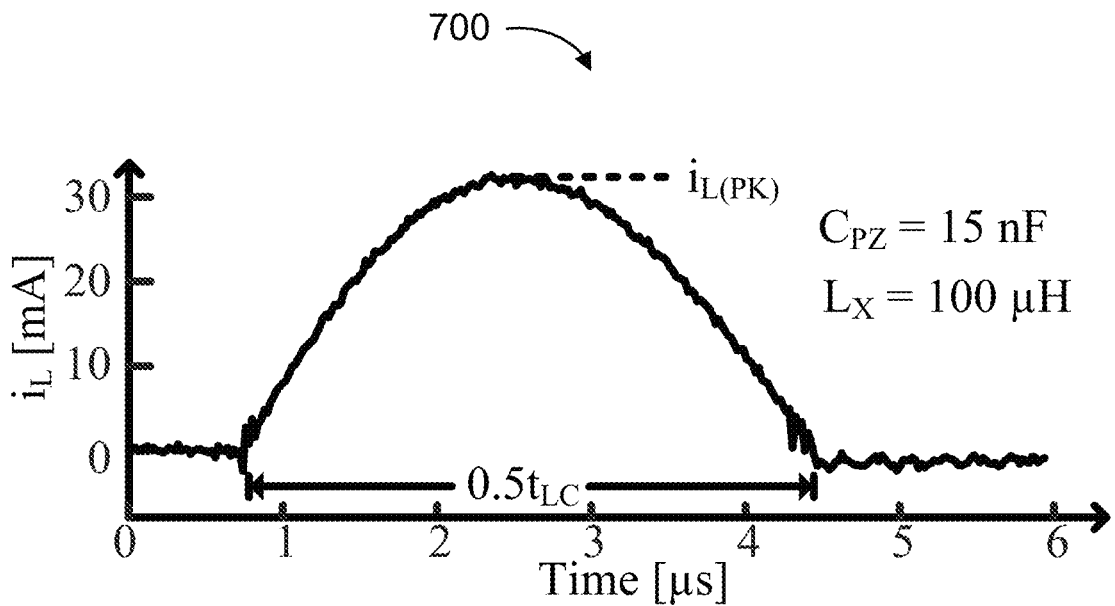
FIG. 7 shows a graph 700 measured current for recycling transfers, in accordance with an exemplary embodiment of the disclosed technology.

FIG. 7 shows measured current $i_L$ through the inductor Lx 322 for recycling transfers, in accordance with an exemplary embodiment of the disclosed technology. From 0.7 μs to 1.5 μs, $C_{PZ}$ energizes Lx using the switching configuration of FIG. 5B.

Lx 322 then charges the battery 324 using the switching configuration of FIG. 5C from 1.1 μs to 2.3 μs in FIG. 6, and from 1.5 μs to 1.8 μs in FIG. 7. The dotted lines in FIG. 6 are labeled "indirect" transfers because the $C_{PZ}$ does not connect directly to both the inductor Lx 322 and the battery 324.

In accordance with certain exemplary implementations of the disclosed technology, "direct" inductor transfers can reduce ohmic loss. The first type of the direct transfers is the direct-indirect transfer, (shown in FIG. 6) which starts out with the controller 330 connecting $C_{PZ}$ 304, Lx 322, and the battery 324 using SGI− 308, SI+ 310 and SO− 320, as shown in FIG. 5D to energize the inductor Lx 322 and to charge the battery 324 directly. This is possible when $V_{PZ(PK)}$ is higher than $V_B$ so that the $i_L$ flows from the capacitor $C_{PZ}$ 304 to the battery 324. This is usually the case because $V_{PZ(PK)}$ should be close to $V_{BD}$ to increase drawn power. Again, when the voltage drop on $C_{PZ}$ 304 reaches the targeted $\Delta V_{PZ}$, SI+ 310 opens and SG+ 314 closes, as shown in FIG. 5C and $i_L$ charges the battery 324. Like the indirect case, the controller 330 may adjust the target $\Delta V_{PZ}$ by varying the energizing time. The corresponding inductor current $i_L$ and capacitor voltage waveforms for such direct transfers are shown in the solid traces in FIG. 6. Certain details of the direct and/or indirect transfers are discussed in Yang, Siyu & Rincon-Mora, Gabriel. (2019). Least Lossy Piezoelectric Energy-Harvesting Charger. 275-278. 10.1109/MWSCAS.2019.8885007, which is incorporated by reference herein as if presented in full.

When vibration on the PZT 302 is low, the maximum power point (MPP) can be when $V_{PZ(PK)}$ is lower than $V_B$, in which case, the indirect-direct scheme can work. In this case, the inductor Lx 322 may first be energized with the switching configuration of FIG. 5B as $V_{PZ}$ falls, which is depicted by the solid traces from 0.5 μs to 1.2 μs in FIG. 6. The energizing stops before $V_{PZ}$ drops by the targeted $\Delta V_{PZ}$. Then, both $V_{PZ}$ and $i_L$ drains to charge the battery via switches SGI− 308, SI+, 310 and SO− 320, using the switching configuration shown in FIG. 5D. This way, $C_{PZ}$ 304 transfers a portion of the energy directly into the battery 324, allowing the inductor Lx 322 to transfer more energy than it carries, reducing ohmic loss.

Between half-cycles, the controller may sense when the $i_{PZ}$ reaches 0 and it may initiate a recycling transfer to recycle the charge from $C_{PZ}$ 304 back to $C_{PZ}$ 304 in the opposite direction. In this case, $C_{PZ}$ may first drain into Lx 322, and when $V_{PZ}$ is discharged to 0, $i_{PZ}$ still flowing in the same direction, may drain into the opposite side of $C_{PZ}$ 304 by closing SI+ 310 and SI− 312 for the half LC oscillation cycle to first drain $C_{PZ}$ 304 into Lx 322, then charge $C_{PZ}$ 304 in the negative direction, as the inductor current $i_L$ in FIG. 7 shows. At the end of the positive half cycle, the switch configuration shown in FIG. 5B may be used to drain $C_{PZ}$ 304 to energize Lx 322. As $V_{PZ}$ reaches 0, the controller 330 may open SGI− 308 and close SGI+ 306 to connect the first end *1 of $C_{PZ}$ 304 ($V_{PZ+}$) to ground, and Lx 322 can charge into the second end *2 of $C_{PZ}$ 304 ($V_{PZ-}$) using the switch configuration shown in FIG. 5E. As a result, during the entire operation, there may be no negative voltage in the switched-inductor charger 300.

The drawn power may be expressed as the integral of the instantaneous power $i_{PZ} \times V_{PZ}$ over a vibration cycle $t_{VIB}$ divided by the vibration cycle period $t_{VIB}$ $$P_{PZ} = \frac{\int_0^{t_{VIB}} i_{PZ} v_{PZ} dt}{t_{VIB}}. \tag{2}$$

Because the operation is completely symmetrical, it is equivalent to integral over a half cycle divided by half of a vibration period $$\begin{aligned} P_{PZ} &= \frac{\int_0^{0.5 t_{VIB}} i_{PZ} v_{PZ} dt}{0.5 t_{VIB}} \\ &\approx 2 f_{VIB} v_{PZ(AVG)} \int_0^{0.5 t_{VIB}} i_{PZ} dt \\ &\approx 2 f_{VIB} (v_{PZ(PK)} - 0.5 \Delta v_{PZ})(C_{PZ} \Delta v_{PZ(OC)}), \end{aligned} \tag{3}$$

where $f_{VIB}$ is the frequency of the vibration. From (3), the drawn power is $2C_{PZ}V_{BD}\Delta V_{PZ(OC)}f_{VIB}$, which is the highest possible drawn power, when the $\Delta V_{PZ}$ for each battery charging transfer is negligibly small. The drawn power drops with higher $\Delta V_{PZ}$. Even though keeping $\Delta V_{PZ}$ small increases drawn power, it also increases the number of battery-charging transfers $N_B$ in each cycle, which can increase power losses Unfortunately drawing more power from the piezoelectric source may lead to more losses. The main source of the power loss is from the equivalent series resistance (ESR) through the inductor current path, and the charge loss to switch the power switches on and off. Other losses include overlap loss, shoot-through loss, leakage, and quiescent power to control the circuits.

For each energy transfer, the current $i_L$ that goes through the inductor, transducer, and the associated closed switches suffer ohmic loss along their path. The ohmic loss is the root-mean-square current squared $i_{L(RMS)}^2$, times the ESR, times the duration of the transfer $t \neg x$. Therefore, the total ohmic loss may be expressed as is $$\begin{aligned} P_R &= \frac{N_B E_{R(B)} + E_{R(R)}}{0.5 t_{VIB}} \\ &\approx (N_B i_{L(RMS \cdot B)}^2 t_B R_B + i_{L(RMS \cdot R)}^2 t_R R_R)(2 f_{VIB}), \end{aligned} \tag{4}$$

where $N_B$ is the number of battery-charging transfers in a half cycle, $i_{L(RMS,B)}$ and $i_{L(RMS,R)}$ are the RMS current, $R_B$ and $R_R$ are the ESR, and $t_B$ and $t_R$ are the transfer time for the battery transfer and recycling transfer, respectively.

From (4), ohmic loss rises with the number of transfers in a vibration cycle. On the other hand, for the same vibration input, the more often the battery-charging transfers, the smaller energy packet each transfer, and the lower the inductor current and transfer time. The ohmic loss also rises with transfer time and RMS current of each transfer. This is why using direct transfers can reduce ohmic loss significantly, having both lower transfer current and transfer time than indirect transfers. Lastly, the ohmic loss is proportional to the ESR. The resistance of the switches is inversely proportional to the width.

On the other hand, the MOSFET switches require a charge to switch on and off, and in the process consumes charge loss or switching loss. Each switch with gate capacitance $C_G$ requires $C_G V_{DD}$ amount of charge for each switching cycle, and since it's supplied from $v_{DD}$, each switch consumes $$E_C = C_G v_{DD}^2. \tag{5}$$

Therefore, the total charge power loss $P_C$ is $$\begin{aligned} P_C &= \frac{N_B E_{C(B)} + E_{C(R)}}{0.5 t_{VIB}} \\ &\approx (N_B C_{G,B} v_{DD}^2 + C_{G,R} v_{DD}^2)(2 f_{VIB}), \end{aligned} \tag{6}$$

where $C_{G,B}$ and $C_{G,R}$ are the gate capacitance of the battery-charging transfer switches and recycling transfer switches.

The charge power loss from (6) increases with the number of battery transfers in a cycle. Therefore, $P_C$ drops with higher $\Delta v_{PZ}$. The charge loss is proportional to the total gate capacitance of the switches, which rises with width. However, wider switches also result in lower resistance and lower ohmic loss. Therefore, in certain exemplary implementations, each switch 306-320 may be optimally designed so that the ohmic loss balance the gate-charge loss, and the total loss is the lowest, as discussed in S. Yang and G. A. Rincón-Mora, "Piezoelectric CMOS Charger: Highest Output-Power Design," 2020 21st International Symposium on Quality Electronic Design (ISQED), 2020, pp. 292-297, doi: 10.1109/ISQED48828.2020.9137018, which is incorporated herein by reference as if presented in full.

In accordance with certain exemplary implementations of the disclosed technology, the charger 300 may charge the battery $N_B$ times every vibration cycle. For each battery-charging transfer, the energy drawn from the transducer is the energy difference on $C_{PZ}$ $$\Delta E_{PZ} = 0.5 C_{PZ} v_{PZ(PK)}^2 - 0.5 C_{PZ} (v_{PZ(PK)} - \Delta v_{PZ})^2. \tag{7}$$

Because of the losses, the battery may not receive all the power drawn from the transducer. The output power is, therefore, the difference between drawn power and loss $$P_B = \Delta E_{PZ} N_B f_{VIB} - P_R - P_C. \tag{8}$$

Since drawn power and losses both increase with higher $V_{PZ(PK)}$, the maximum power point is when the additional $V_{PZ}$ starts to become lower than the additional loss. When $\Delta V_{PZ(OC)}$ is higher than 1.2 V, $V_{PZ(PK)}$ is the highest at $V_{BD}$ to maintain maximum power-point. Because $V_{BD}$ limits how high $V_{PZ}$ can reach, this region is breakdown limited. However, when the vibration is low, the MPP is at a smaller peak voltage $V_{PZ(PK)}$ Since additional losses overwhelm additional drawn power if $V_{PZ(PK)}$ increases, this region is loss-limited, in that the charger can start outputting power with a vibration of only 0.1 V $\Delta V_{PZ(OC)}$ on the PZT 302.

In certain exemplary implementations of the disclosed technology, the recycling switched-inductor charger 300 can output about 50% of the maximum power when loss-limited and can reach 76% at the maximum vibration strength.

A prototype recycling switched-inductor charger 300 has been implemented in 0.18-μm CMOS technology with on-chip power switches, max block, and gate drivers. The prototype utilizes a Mide V22b piezoelectric transducer, a 100 μH, 0.6Ω transfer inductor, field-programmable gate array (FPGA) that senses the piezoelectric voltage to initiate battery-charging transfers and recycling transfers and generates the control signals for the switches, and a shaker from Brüel & Kjær that can generate 0-110 μA on the transducer which translates to 0-12 V open-circuit voltage.

Figure 8:
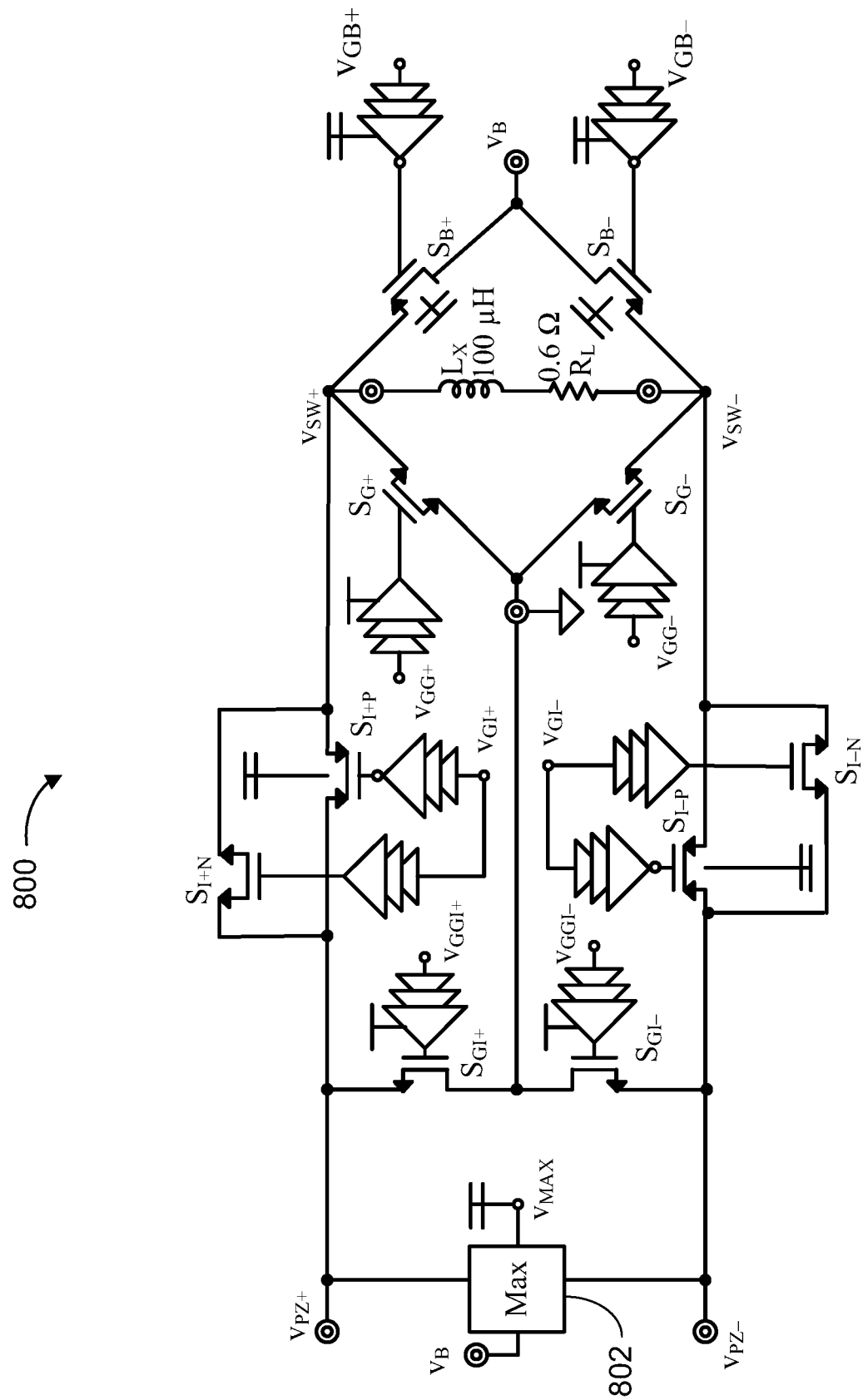
FIG. 8 is an example schematic diagram of a power stage implemented in CMOS, in accordance with an exemplary embodiment of the disclosed technology.

FIG. 8 is an example schematic diagram of a power stage 800 implemented in CMOS, in accordance with an exemplary embodiment of the disclosed technology. In this implementation, the power stage 800 can include 8 switches (corresponding to like switches 306-320 in FIG. 3). In this example implementation, the switches SGI+, SGI− SG+, and SG− are ground switches, implemented with N-type MOSFETs. Switches SB+ and SB− are connected to $V_B$, and may be implemented with P-type devices. This way, 0 V at the gate turns them on, and $V_B$ or any voltage above $V_B$ can turn them off. Switches SI+ and SI−, on the other hand, connect two switching nodes that can both swing from 0 to the breakdown voltage. Therefore, in an example embodiment, a transmission gate, with an NMOS and a PMOS in parallel, may be utilized. Note that some of the MOSFETs have two arrows on its symbol because the current can flow in either direction in different transfers, and the source, which the arrow denotes, can be at either side of the NMOS. Otherwise, they may be standard 3.3-V devices.

When an NMOS (PMOS) is turned off and its bulk voltage is a diode voltage below (above) its source voltage, the body diode turns on and conducts unwanted current. For NMOS switches, since there is no negative voltage in the system, all the NMOS can have their bulk connect to ground, and the body diodes will not turn on. The PMOS switches, on the other hand, are different because the piezoelectric voltage varies between 0 and VBD, while the battery voltage can also be between 0 and VBD. Therefore, the piezoelectric voltage can be higher or lower than the battery voltage. To avoid leakage through the body diodes, the bulk of the PMOS switches may be connected to the highest voltage. In an example implementation, a max block 802 may be utilized to select the highest of the three voltages among $V_{PZ+}$, $V_{PZ-}$, and $V_B$ to feed the bulk and the gate drivers of the PMOS.

In accordance with certain exemplary implementations of the disclosed technology, the MOSFET switches may be designed to have minimum channel length to reduce on-resistance and gate capacitance. Even though the chip is fabricated in 0.18-μm CMOS technology, the 3.3 V devices may be fabricated to have 350 nm and 300 nm minimum channel length for NMOS and PMOS respectively.

In certain exemplary implementations, the channel widths of the switches may be carefully designed to reduce losses. Since the on-resistance is inversely proportional to the channel width yet the gate capacitance is proportional to it, there is an optimum width for each switch such that the sum of the ohmic loss and gate charge power loss is the lowest. Specifically, the total loss on a switch is the lowest when the ohmic loss is the same as the gate charge power loss. In certain exemplary implementations, the switches may be optimized so that each switch is the least lossy.

Figure 9:
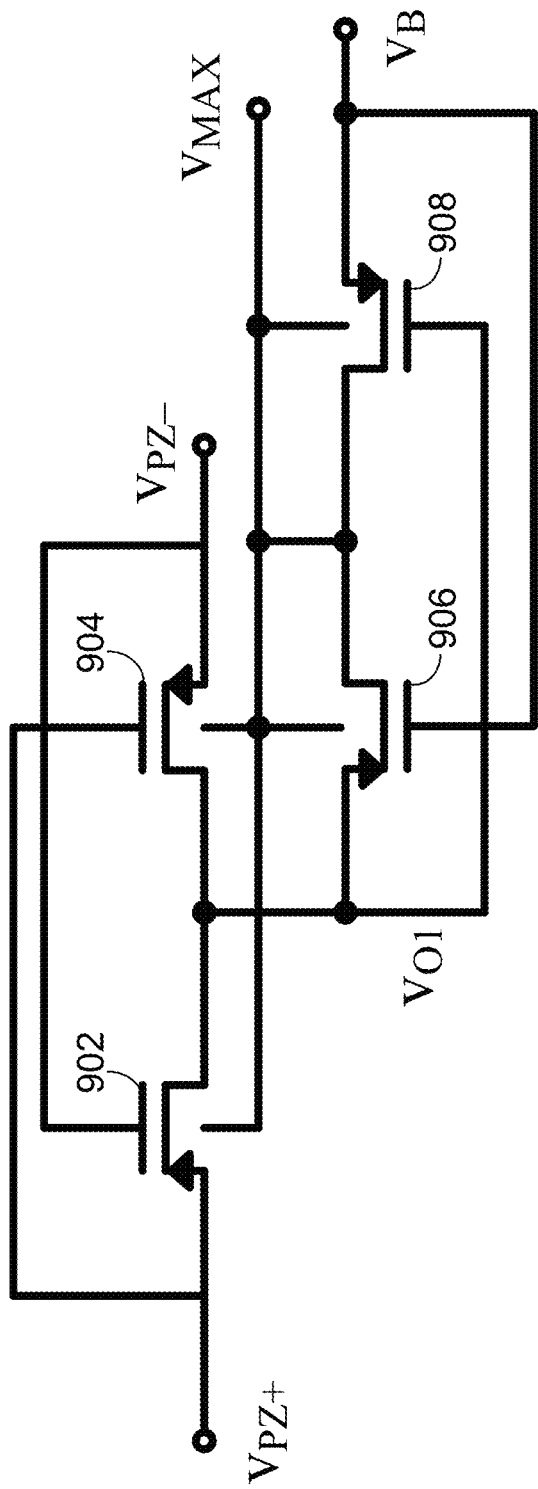
FIG. 9 is an example schematic diagram of a max voltage block, in accordance with an exemplary embodiment of the disclosed technology.

As discussed with respect to FIG. 8, the max block 802 may be configured to output the highest voltage among its three inputs $V_{PZ+}$, $V_{PZ-}$, and $V_B$. FIG. 9 is an example schematic diagram of a max block (such as the max block 802 shown in FIG. 8) including, for example, switches 902-908, in accordance with an exemplary embodiment of the disclosed technology. In this implementation, two cross-coupled PMOS pairs may be utilized to accomplish this function. Each cross-coupled PMOS pair may connect the middle node to the higher input if it's at least a threshold higher than the other input. As shown in FIG. 9, $V_{O1}$ may be connected to the higher of $V_{PZ+}$ and $V_{PZ-}$, and $V_{MAX}$ may be connected to the higher voltage of $V_{O1}$ and $V_B$. Since $V_{MAX}$ is the highest voltage of all, the bulks of the PMOS may be connected to it.

Returning to FIG. 8, because the MOSFET switches have large widths to balance ohmic loss and switching loss, gate drivers may be used to turn them on and off. In certain exemplary implementations, an inverter chain with each stage 2.72× larger than the previous stage can produce the shortest delay. However, increasing the number of the stages can result in larger switching and shoot-through losses. Because the extra pico-seconds delay may not affect the operation of the charger, an inverter chain in which each stage is 5× to 10× larger than the previous stage may be used as drivers.

Figure 10:
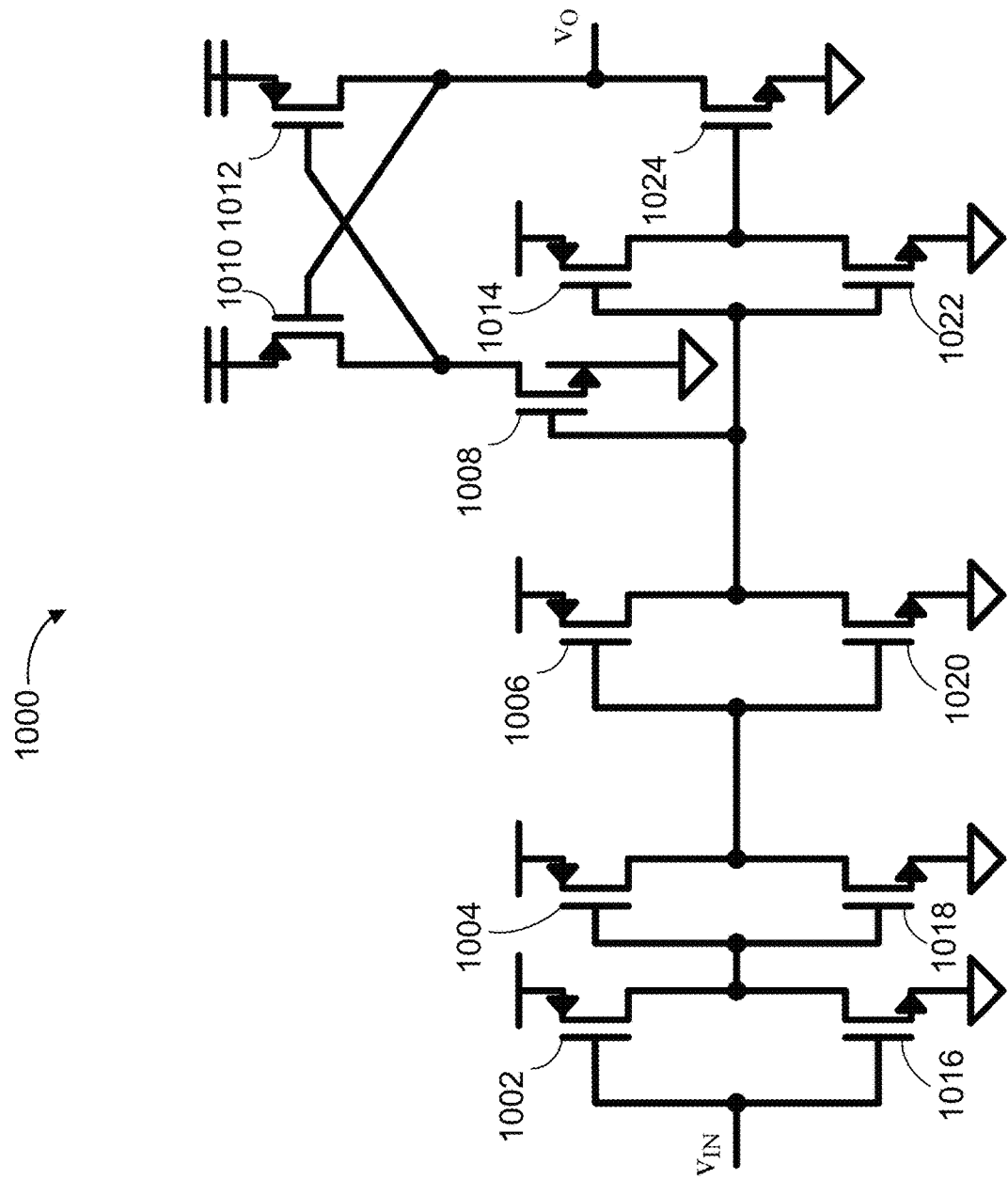
FIG. 10 is an example schematic diagram of gate drivers for the PMOS devices (such as the gate drivers illustrated in FIG. 8) in accordance with an exemplary embodiment of the disclosed technology.

FIG. 10 is an example schematic diagram 1000 of gate drivers for the PMOS devices (such as the gate drivers illustrated in FIG. 8) including, for example, switches 1002-1024 in accordance with an exemplary embodiment of the disclosed technology. In this example embodiment, the NMOS switches can be turned on with $V_B$ and turned off with ground. The PMOS switches, on the other hand, may be turned on with ground and turned off with $V_{MAX}$. Therefore, a level shifter may be used between the signals from the controller and the gate. In certain exemplary implementations, the level shifter with cross-coupled PMOS may be used as the last stage of the inverter chain, to minimize the loss on the gate driver.

Figure 11:
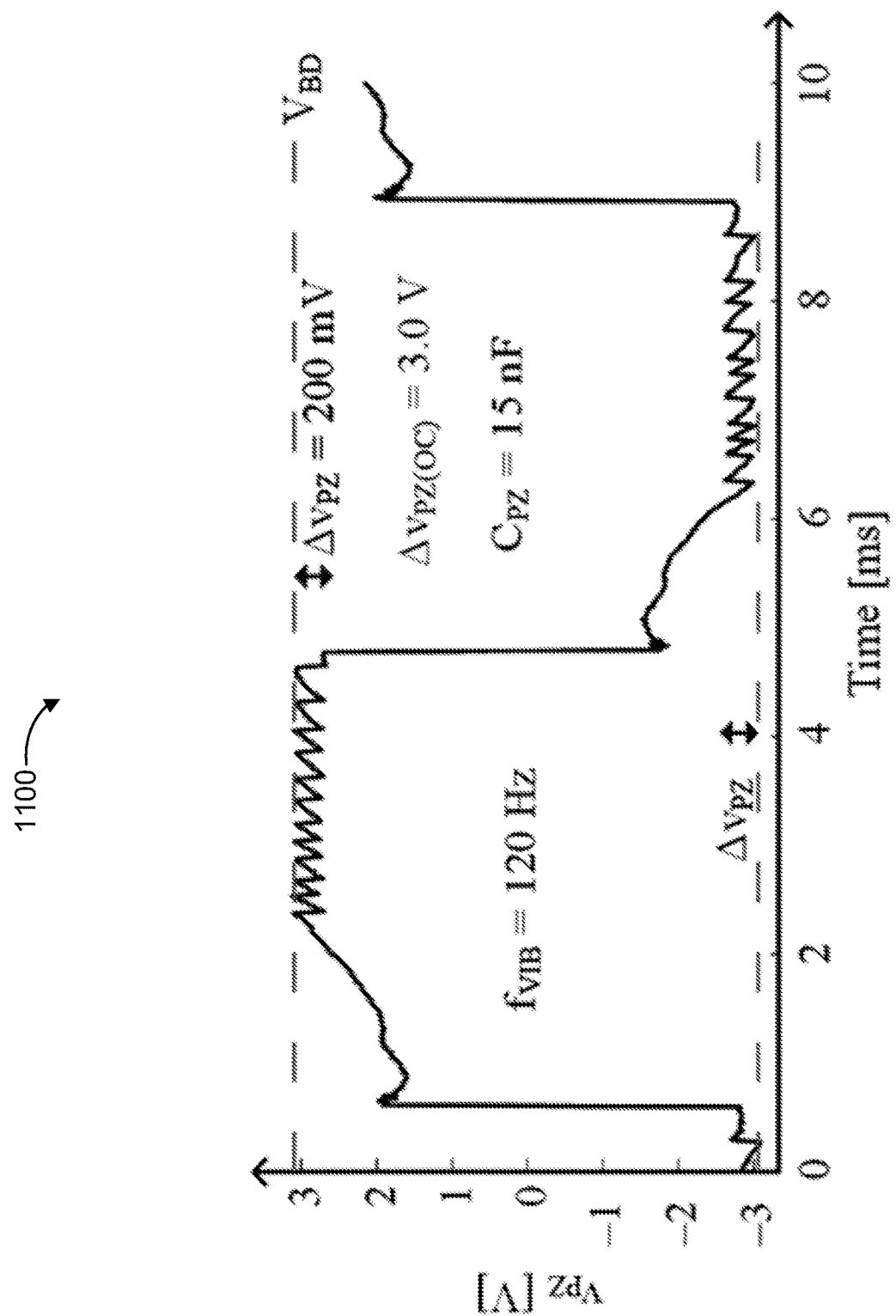
FIG. 11 is the measured voltage across the piezoelectric transducer over a full vibration cycle including the effects of the switching, in accordance with a certain exemplary implementation of the disclosed technology.

A prototype was fabricated in 0.18-μm CMOS technology with an active area of 500×550 μm². A 16-pin small-outline integrated circuit (SOIC) package with a 10×50×1 mm³ piezoelectric transducer and a 5×5×3 mm³, 100 μH, 0.6Ω inductor, was soldered onto a printed circuit board (PCB) to test its functionality. FIG. 11 shows measured voltage 1100 across the piezoelectric transducer over a full vibration cycle including the effects of the switching, in accordance with a certain exemplary implementation of the disclosed technology. This differs from the waveforms shown in FIG. 4 in that the losses that occurred in the recycling transfers resulted in the voltage at the start of the half-cycle being lower than that at the end. As a result, the drawn power is slightly reduced, and the number of battery-charging transfers in a cycle NB also drops.

The FPGA controller, the DE1-SoC Development Kit, (depicted as controller 330 in FIG. 3) was utilized to sense when $V_{PZ}$ reaches the desired $V_{PZ(PK)}$ to initiate a battery-charging transfer. The FPGA may be set to indirect mode, direct-indirect mode, or indirect-direct mode. The FPGA may adjust the energizing time to control the voltage drop $\Delta V_{PZ}$ for each battery-charging transfer in each mode described above. The drain time may be set when the inductor current reaches 0. The FPGA may also sense when half-cycles end to initiate recycling transfers by comparing $V_{PZ}$ against its previous value, and senses when $|V_{PZ}|$ starts to drop. Even though the prototype FPGA may consume more power than the controllers in the state of the arts, 1.5 μW may be subtracted from the measured output power for comparisons.

Figure 12:
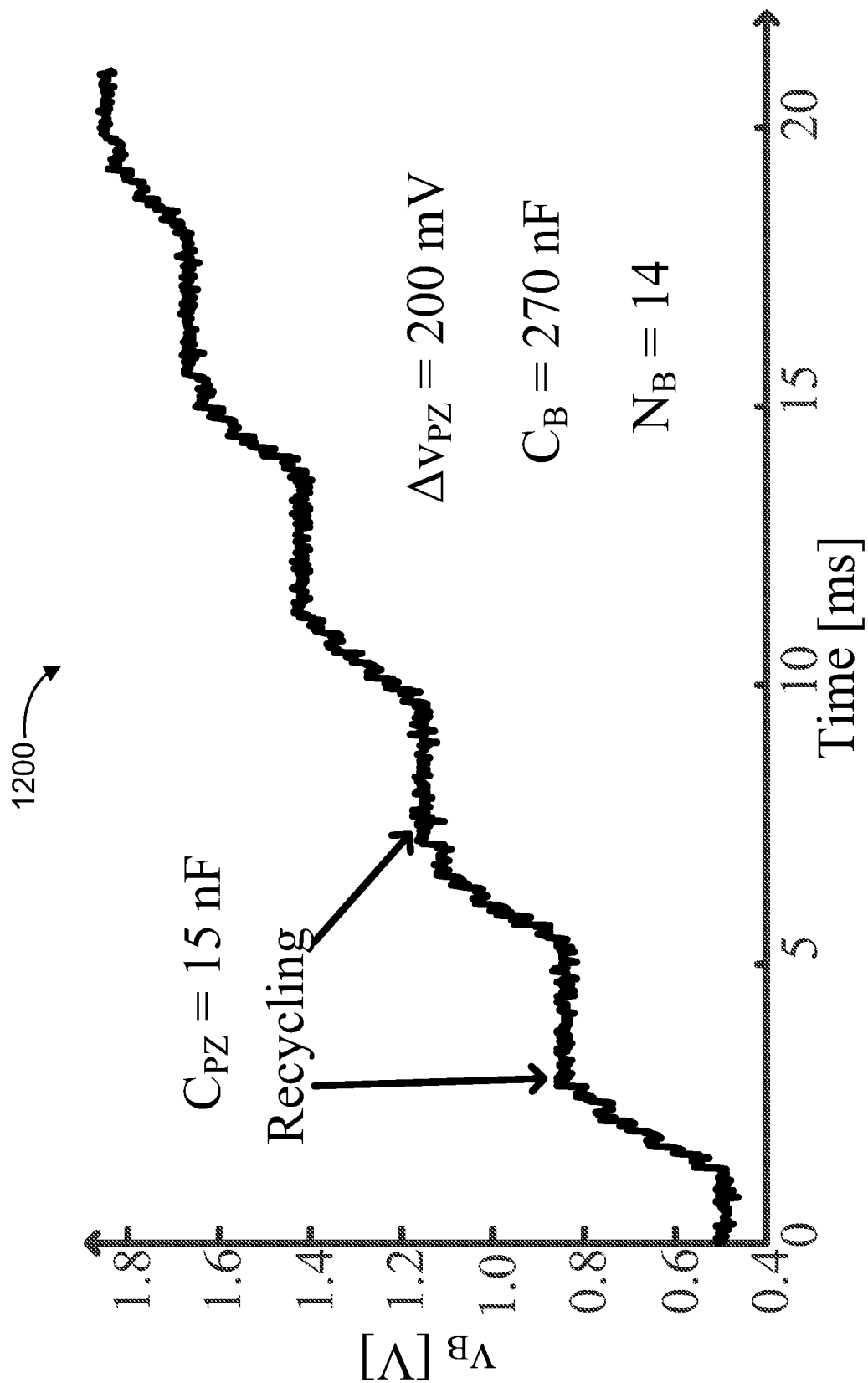
FIG. 12 is the measured voltage across the energy storage device as energy is transferred and recycled, in accordance with a certain exemplary implementation of the disclosed technology.

FIG. 12 is measured voltage 1200 across an energy storage device as energy is transferred and recycled, in accordance with a certain exemplary implementation of the disclosed technology. In this measurement, a 270-nF was capacitor is used to highlight the battery charging profile, while normally the battery has a much larger capacitance to maintain functionality for the wireless microsystem. The charging profile shown in FIG. 12 is intermittent because after each recycling transfer, it takes some time for the piezoelectric voltage to reach the breakdown voltage again.

In this case, a recycling transfer occurs at 3 ms and the transducer charges $C_{PZ}$ to $V_{BD}$ at 5.5 ms to start battery transfers. FIG. 12 shows that with each battery transfer, the battery receives energy throughout the range of 0.5 V to 2.5 V. As a result, the need for an extra maximum power-point charging stage (with a separate switching inductor) can be eliminated.

Figure 13:
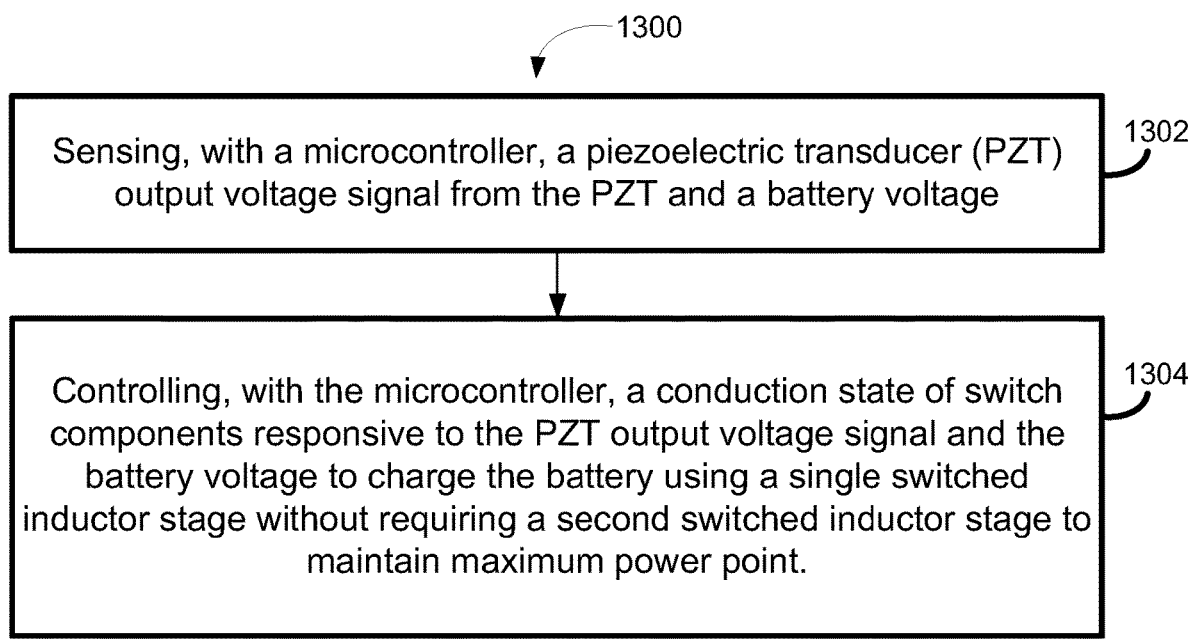
FIG. 13 is a flow diagram of a method 1300, according to an example embodiment of the disclosed technology.

FIG. 13 is a flow diagram of a method 1300 of harvesting vibration-induced current from a piezoelectric transducer (PZT) to charge a battery (B) using an inductor (Lx) and a switch circuit, according to an example embodiment of the disclosed technology. In block 1302, the method 1300 includes sensing, with a microcontroller, a PZT output voltage signal from the PZT, and a battery voltage. In block 1304, the method 1300 includes controlling, with the microcontroller, a conduction state of switch components in the switch circuit responsive to the PZT output voltage signal and the battery voltage to charge the battery using a single switched inductor stage without requiring a second switched inductor stage to maintain the MPP.

In accordance with certain exemplary implementations of the disclosed technology, the switch components can include a positive current grounding switch (SGI+); a negative current grounding switch (SGI−); a positive current energizing switch (SI+); a negative current energizing switch (SI−); a positive bridge grounding switch (SG+); a negative bridge grounding switch (SG−); a positive bridge output switch (SO+); and/or a negative bridge output switch (SO−).

In certain exemplary implementations, each of the circuit components has a corresponding first end (*1) and a corresponding second end (*2) and are connected such that: PZT*1 is connected to SGI+*1 and SI+*1; PZT*2 is connected to SGI−*2 and SI−*1; +*2 is connected to SGI−*1 and a ground; SI+*2 is connected to SG+*1, SO+*1, and Lx*1; SI−*2 is connected to SG−*2, SO−*2, and Lx*2; SO+*2 is connected to SO−*1 and B*1; and B*2 is connected to the ground, where x*1 represents the first end of component x, and x*2 represents the second end of component x.

In certain implementations, the battery may be charged at a maximum power point (MPP).

In accordance with certain exemplary implementations of the disclosed technology, controlling the conduction state of the switch components can include controlling the conduction state of each of the switch components responsive to the PZT output voltage signal.

According to an exemplary implementation of the disclosed technology, and during a positive first half cycle of the PZT output voltage signal, controlling the conduction state of the switch components can include: closing only SGI− to ground the PZT*2 and charging a PZT capacitance $C_{PZ}$ to a positive voltage; then closing switch components SI+, SI−, and SGI−, and opening switch components SGI+, SG+, SG−, SO+, and SO− and energizing the Lx; then opening SI+ and SI− and closing SG+ and SO− and charging the B from the Lx; and then closing SI+ and SGI− and opening SG+ and energizing Lx and charging B.

According to an exemplary implementation of the disclosed technology, and during a negative second half cycle of the PZT output voltage signal, controlling the conduction state of the switch components can include: opening SGI−, SG+, SG−, SO+, and SO−, and closing SGI+, SI+, and SI− and recycling energy from Lx to charge a PZT capacitance $C_{PZ}$ to a negative voltage; then closing switch components SI+, SI−, and SGI+, and opening switch components SGI−, SG−, SG+, SO−, and SO+ and energizing the Lx; then opening SI+ and SI− and closing SG− and SO+ and charging the B from the Lx; and then closing SI− and SGI+ and opening SG− and energizing Lx and charging B.

In certain exemplary implementations, the period of the PZT output voltage signal is configured between 10 to 100 times greater than a time constant associated with the L and the $C_{PZ}$.

In accordance with certain exemplary implementations of the disclosed technology, only a positive voltage charges the battery.

According to an exemplary implementation of the disclosed technology, switch components comprise MOSFETs.

According to an exemplary implementation of the disclosed technology, each of the switch components includes corresponding gate driver circuits in communication with a microcontroller.

Comparisons of the state of the art have been categorized and summarized in Table 1. Non-ideal diode bridges and half bridges can draw less than $P_{IDEAL}$. As a result, the power index for the basic bridge is well under 1. The switched-inductor power stage disclosed herein improves upon the basic bridges by collecting all the charge. It can draw as much as four times higher power than the ideal bridge can draw. Pre-charging further increases the voltage the charge is generated at. Even though the power stage consumes more ohmic and charge loss, the output power index can be as high as 6.8.

Recycling bridges can draw the highest power because the piezoelectric voltage can be the highest at near VBD. However, they require a MPP charger to regulate the rectified voltage at the breakdown voltage, and the most efficient way to accomplish that is to use another switched-inductor power stage. A two-inductor solution is not ideal for the microsystem application, and because of the added losses, the output power index is still only about 6.8.

The recycling switched-inductor charger disclosed herein also draws high power because $V_{PZ}$ is near the breakdown voltage across the half cycle. Moreover, it does not require a second stage or a second inductor to achieve maximum power-point, since it can charge the battery directly across its range. By dividing the open circuit voltage gain $V_{PZ(OC)}$ into smaller pieces, the disclosed technology can withstand wider input vibration strength range. Therefore, it can output up to 85 μW from 10.5 V open circuit voltage gain from a 120 Hz vibration on a 15-nF piezoelectric capacitance. Using direct transfers further reduces the ohmic losses. The output power can be up to 91 μW with an output power index of 12×, outperforming the state of the arts despite the lowest breakdown limit.

Another significant advantage of the disclosed power stage technology is that it can output net power when the vibration is very low. In this respect, the charger may start outputting power when the vibration only generates 0.1 V peak to peak open-circuit voltage on the capacitance, which is five times lower than previous devices. This is because all the losses can scale with input power. The 12× power index is achieved when the vibration is low: it outputs 100 nW net power with 0.1 V $\Delta V_{PZ(OC)}$, which corresponds with 8 nW of $P_{IDEAL}$. Even though the disclosed power stage has the greatest number of switches, because of the low breakdown voltage and the low ohmic loss thanks to direct transfers, the active area is still among the lowest of the state of the art. With a wider input range, the charger can charge the battery more frequently.

TABLE 1

| | JSSC [1] | JSSC [2] | TCAS-I [3] | This Work |
|---|---|---|---|---|
| | | Relative Performance | | |
| Power Stage | Diode Bridge | Recycling SL | Diode Bridge | Recycling SL |
| $L_{MIN}$ | 1 µm | 350 nm | 250 nm | 0.3-0.35 µm |
| $V_{BD}$ | | | | 3.3 V |
| Si. Area | 4.25 mm² | 9.0 mm² | 0.75 mm² | 0.26 mm² |
| $L_X$ | | 1000 µH | 220 µH | 100 µH |
| $R_L$ | | | | 0.6 Ω |
| $C_{PZ}$ | 12 nF | 5.2 µF | 19 nF | 15 nF |
| $f_{VIB}$ | 225 Hz | 82 Hz | 144 Hz | 120 Hz |
| $\Delta_{VPZ(OC)}$ | 4.8 V | 1.0-12 V | 9.8 V | 0.15-10.5 V |
| $P_{IDEAL}$ | 15.6 µW | 0.11-15.3 mW | 65.7 µW | 0.008-41 µW |
| $P_{PZ}$ | 8.2 µW | | | 0.2-120 µW |
| $P_{O(MPP)}$ | 7.5 µW | 1.7 mW | 136 µW | 0.1-91 µW |
| $P_Q$ | | 777 nW | 1.5 µW | Off Chip |
| $\eta_{O(MPP)}$ | 48% | | 2.1× | 2.5-12× |
| $\eta_{O(BD)}$ | | 39%* | | Up to 76% |
| Components | 4 FETs MPP Buffer | $L_X$, 6 FETs MPP Buffer | $L_X$, 4 FETs MPP Buffer | $L_X$, 10 FETs |

[1] Y. K. Ramadass and A. P. Chandrakasan, "An efficient piezoelectric energy harvesting interface circuit using a bias-flip rectifier and shared inductor," IEEE J. Solid-State Circuits, vol. 45, no. 1, pp. 189-204, January 2010.

[2] S. Du, Y. Jia, C. D. Do, and A. A. Seshia, "An efficient SSHI interface with increased input range for piezoelectric energy harvesting under variable conditions," IEEE J. Solid-State Circuits, vol. 51, no. 11, pp. 2729-2742, November 2016.

[3] L. Wu, X. Do, S. LEE and D. S. Ha, "A self-powered and optimal SSHI circuit integrated with an active rectifier for piezoelectric energy harvesting," IEEE Transactions on Circuits and Systems-I, vol. 64, no. 3, pp. 537-549, March 2017.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. A switched-inductor power harvesting charger device, comprising:
   circuit components, including:
      a piezoelectric transducer (PZT);
      an inductor (Lx); and
      a power storage device (B); and
      switch components, comprising:
         a positive current grounding switch (SGI+);
         a negative current grounding switch (SGI−);
         a positive current energizing switch (SI+);
         a negative current energizing switch (SI−);
         a positive bridge grounding switch (SG+);
         a negative bridge grounding switch (SG−);
         a positive bridge output switch (SO+);
         a negative bridge output switch (SO−);
   wherein each of the circuit components have a corresponding first end (*1) and a corresponding second end (*2);
   wherein:
      PZT*1 is connected to SGI+*1 and SI+*1;
      PZT*2 is connected to SGI−*2 and SI−*1;
      SGI+*2 is connected to SGI−*1 and a ground;
      SI+*2 is connected to SG+*1, SO+*1, and Lx*1;
      SI−*2 is connected to SG−*2, SO−*2, and Lx*2;
      SO+*2 is connected to SO−*1 and B*1; and
      B*2 is connected to the ground; and
   wherein the switch components are individually controllable to transfer a vibration-induced current from the PZT to the B for charging the B.

2. The device of claim 1, wherein the PZT is characterized as a vibration-induced current source $i_{PZ}$ in parallel with a capacitor $C_{PZ}$, and wherein the $C_{PZ}$ is characterized as having a capacitance in a range between 1 nanofarad and 1 microfarad.

3. The device of claim 1, wherein the B comprises one or more of a battery, a capacitor, a supercapacitor, or an ultracapacitor.

4. The device of claim 1, wherein the switch components are individually controllable to transfer a vibration-induced current from the PZT to charge the B at a maximum power point (MPP) using a single switched inductor stage without requiring a second switched inductor stage to maintain the MPP.

5. The device of claim 1, further comprising a microprocessor controller configured to sense a PZT output voltage signal from the PZT and to control a conduction state of each of the switch components responsive to the PZT output voltage signal.

6. The device of claim 5, wherein:
   during a positive first half cycle of the PZT output voltage signal, the microprocessor controller is configured to:
      close only SGI− to ground the PZT*2 and charge a capacitance $C_{PZ}$ of the PZT to a target maximum power point voltage $V_{PZ(PK)}$; then
      close switch components SI+, SI−, and SGI−, and open switch components SGI+, SG+, SG−, SO+, and SO− to energize the Lx; then open SI+ and SI– and close SG+ and SO– to charge the B from the Lx; and during a negative second half cycle of the PZT output voltage signal, the microprocessor controller is configured to:

open SGI–, SG+, SG–, SO+, and SO–, and close SGI+, SI+, and SI– to recycle energy from Lx to charge a PZT capacitance $C_{PZ}$ to a negative voltage; then close switch components SI+, SI–, and SGI+, and open switch components SGI–, SG–, SG+, SO–, and SO+ to energize the Lx; then open SI+ and SI– and close SG– and SO+ to charge the B from the Lx; and open SGI+, SG+, SG–, SO+, and SO–, and close SGI–, SI+, and SI– to recycle energy from Lx to charge the capacitance $C_{PZ}$ to a positive voltage.

7. The device of claim 6, wherein a period of the PZT output voltage signal is between 100 to 100,000 times greater than a time constant associated with the L and the $C_{PZ}$.

8. The device of claim 6, wherein only a positive voltage charges B.

9. The device of claim 1, wherein the switch components comprise MOSFETs.

10. The device of claim 9, wherein each of the switch components further comprise gate driver circuits in communication with a microprocessor controller.

11. The device of claim 1, further comprising further comprising a microprocessor controller and a long term battery configured to power the microprocessor controller, wherein the microprocessor controller is configured to sense a PZT output voltage signal from the PZT and to control a conduction state of each of the switch components responsive to the PZT output voltage signal.

12. A method of harvesting vibration-induced current from a piezoelectric transducer (PZT) to charge a power storage device (B) using an inductor (Lx) and a switch circuit, the method comprising:

sensing, with a microcontroller, a PZT output voltage signal from the PZT; and controlling, with the microcontroller, a conduction state of switch components in the switch circuit responsive to the PZT output voltage signal to charge the B; wherein the switch components comprise:
- a positive current grounding switch (SGI+);
- a negative current grounding switch (SGI–);
- a positive current energizing switch (SI+);
- a negative current energizing switch (SI–);
- a positive bridge grounding switch (SG+);
- a negative bridge grounding switch (SG–);
- a positive bridge output switch (SO+);
- a negative bridge output switch (SO–);

wherein each of the circuit components have a corresponding first end (*1) and a corresponding second end (*2);

wherein:

PZT*1 is connected to SGI+*1 and SI+*1;
PZT*2 is connected to SGI–*2 and SI–*1;
SGI+*2 is connected to SGI–*1 and a ground;
SI+*2 is connected to SG+*1, SO+*1, and Lx*1;
SI–*2 is connected to SG–*2, SO–*2, and Lx*2;
SO+*2 is connected to SO–*1 and B*1; and
B*2 is connected to the ground.

13. The method of claim 12, further comprising charging the B at a maximum power point (MPP) using a single switched inductor stage without requiring a second switched inductor stage to maintain the MPP.

14. The method of claim 12, wherein controlling the conduction state of the switch components further comprises controlling a conduction state of each of the switch components responsive to the PZT output voltage signal.

15. The method of claim 12, wherein controlling the conduction state of the switch components further comprises:

during a positive first half cycle of the PZT output voltage signal:

closing only SGI– to ground the PZT*2 and charging a capacitance $C_{PZ}$ of the PZT to a target maximum power point voltage $V_{PZ(PK)}$; then closing switch components SI+, SI–, and SGI–, and opening switch components SGI+, SG+, SG–, SO+, and SO– and energizing the Lx; and then opening SI+ and SI– and closing SG+ and SO– and charging the B from the Lx.

16. The method of claim 12, wherein controlling the conduction state of the switch components further comprises:

during a negative second half cycle of the PZT output voltage signal:

opening SGI–, SG+, SG–, SO+, and SO–, and closing SGI+, SI+, and SI– and recycling energy from Lx to charge a PZT capacitance $C_{PZ}$ to a negative voltage; then closing switch components SI+, SI–, and SGI+, and opening switch components SGI–, SG–, SG+, SO–, and SO+ and energizing the Lx; then opening SI+ and SI– and closing SG– and SO+ and charging the B from the Lx; and then opening SGI+, SG+, SG–, SO+, and SO–, and closing SGI–, SI+, and SI– to recycle energy from Lx to charge the capacitance $C_{PZ}$ to a positive voltage.

17. The method of claim 12, wherein a period of the PZT output voltage signal is configured between 100 to 100,000 times greater than a time constant associated with the L and a capacitance $C_{PZ}$ of the PZT.

18. The method of claim 12, wherein only a positive voltage charges B.

19. The method of claim 12, wherein the switch components comprise MOSFETs.

20. The method of claim 19, wherein each of the switch components further comprise gate driver circuits in communication with a microcontroller.

* * * * *